(12) United States Patent
Smidth

(10) Patent No.: US 8,989,217 B2
(45) Date of Patent: Mar. 24, 2015

(54) ADAPTIVE MULTI-SERVICE DATA FRAMING

(71) Applicant: Exalt Communications Incorporated, Campbell, CA (US)

(72) Inventor: Peter Smidth, San Luis Obispo, CA (US)

(73) Assignee: Exalt Wireless, Inc., Campbell, CA (US)

( * ) Notice: Subject to any disclaimer, the term of this patent is extended or adjusted under 35 U.S.C. 154(b) by 50 days.

(21) Appl. No.: 13/657,759

(22) Filed: Oct. 22, 2012

(65) Prior Publication Data

US 2013/0044626 A1 Feb. 21, 2013

Related U.S. Application Data

(63) Continuation of application No. 12/345,290, filed on Dec. 29, 2008, now Pat. No. 8,295,304.

(60) Provisional application No. 61/017,128, filed on Dec. 27, 2007, provisional application No. 61/017,129, filed on Dec. 27, 2007, provisional application No. 61/017,130, filed on Dec. 27, 2007, provisional application No. 61/017,132, filed on Dec. 27, 2007, provisional application No. 61/042,671, filed on Apr. 4, 2008.

(51) Int. Cl.
| | |
|---|---|
| *G01R 31/08* | (2006.01) |
| *H04W 4/00* | (2009.01) |
| *H04J 3/16* | (2006.01) |
| *H04J 3/24* | (2006.01) |
| *H04W 28/22* | (2009.01) |
| *H04L 1/00* | (2006.01) |
| *H04W 28/04* | (2009.01) |
| *H04W 72/04* | (2009.01) |

(52) U.S. Cl.
CPC ............. *H04W 28/22* (2013.01); *H04L 1/0003* (2013.01); *H04L 1/0017* (2013.01); *H04W 28/048* (2013.01); *H04W 72/0446* (2013.01)
USPC ............ 370/468; 370/232; 370/329; 370/474

(58) Field of Classification Search
None
See application file for complete search history.

(56) References Cited

U.S. PATENT DOCUMENTS

| | | | |
|---|---|---|---|
| 4,764,921 A | * | 8/1988 | Graves et al. ................. 370/510 |
| 4,873,702 A | | 10/1989 | Chiu |
| 5,241,702 A | | 8/1993 | Dent |

(Continued)

*Primary Examiner* — Jutai Kao
(74) *Attorney, Agent, or Firm* — Hickman Palermo Truong Becker Bingham Wong LLP

(57) ABSTRACT

When a signal-to-noise ratio affecting radio communication becomes sufficiently low, the data transmission rate is responsively decreased in compensation. The signal-to-noise ratio of the communication link is thereby increased. Data for multiple different services is transmitted in data packets between two radios. By allocating one part, or time slot, of the data packet's payload to one service, and allocating another part, or time slot, of the data packet's payload to another service, communications sessions for multiple services can be maintained concurrently. Services are prioritized relative to each other. In case the signal-to-noise ratio becomes too low, data packet portions that are related to lower-priority services can be omitted from some data packets before those data packets are transmitted. Data remaining in the packet can be sent at a reduced data transmission rate without causing the quality of service for the remaining packets to fall below the minimum required level.

20 Claims, 4 Drawing Sheets

(56) References Cited

U.S. PATENT DOCUMENTS

| | | |
|---|---|---|
| 5,442,655 A | 8/1995 | Dedic et al. |
| 6,671,112 B2 | 12/2003 | Murakami et al. |
| 8,094,767 B1 | 1/2012 | Smidth |
| 2003/0157899 A1* | 8/2003 | Trossen et al. ............. 455/69 |
| 2004/0131028 A1* | 7/2004 | Schiff et al. ............. 370/329 |
| 2010/0040347 A1 | 2/2010 | Kent et al. |
| 2010/0046554 A1* | 2/2010 | Wilkinson ............. 370/474 |
| 2014/0044093 A1* | 2/2014 | Tenny et al. ............. 370/330 |

\* cited by examiner

ADAPTIVE MULTI-SERVICE DATA FRAMING

CLAIM OF PRIORITY

This application is a Continuation of U.S. patent application Ser. No. 12/345,290, filed Dec. 29, 2008, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s) which claims domestic priority under 35 U.S.C. §119 to the following provisional patent applications, each of which is incorporated by reference for all purposes as though fully disclosed herein: U.S. Provisional Patent Application Ser. No. 61/017,128, titled "METHOD FOR AUTOMATIC TIMING SYNCHRONIZATION FOR WIRELESS RADIO NETWORKS," filed on Dec. 27, 2007; U.S. Provisional Patent Application Ser. No. 61/017,129, titled "ADAPTIVE MULTI SERVICE DATA FRAMING," filed on Dec. 27, 2007; U.S. Provisional Patent Application Ser. No. 61/017,130, titled "DECISION DIRECTED DC REMOVAL SCHEME," filed on Dec. 27, 2007; U.S. Provisional Patent Application Ser. No. 61/017,132, titled "MEANS AND APPARATUS FOR MITIGATION OF THERMAL POWER SLUMP IN RADIO DEVICES BY USING A SURROGATE CARRIER," filed on Dec. 27, 2007; and U.S. Provisional Patent Application Ser. No. 61/042,671, titled "ROBUST SYNCHRONIZATION AND PROPAGATION OF TIMING INFORMATION IN A TIME DIVISION DUPLEX RADIO NETWORK," filed on Apr. 4, 2008.

RELATED APPLICATIONS

The present application is related to the following patent applications, each of which is incorporated by reference for all purposes as though fully disclosed herein: U.S. patent application Ser. No. 11/302,102, titled "METHOD AND APPARATUS FOR TIMING AND/OR FREQUENCY SYNCHRONIZATION IN AN RF RECEIVER," filed on Dec. 12, 2005; U.S. patent application Ser. No. 11/301,810, titled "ELECTRONICALLY CONFIGURABLE TRANSMIT AND RECEIVE PATHS FOR FDD WIRELESS COMMUNICATION DEVICES," filed on Dec. 12, 2005; and U.S. patent application Ser. No. 12/138,239, titled "AUTOMATIC TIMING SYNCHRONIZATION FOR WIRELESS RADIO NETWORKS," filed on Jun. 12, 2008.

FIELD OF THE INVENTION

The present invention relates to data communication, and, more specifically, to techniques for automatically, dynamically, and continuously modifying the structure of data frames that are to be carried on a communication medium to compensate for changes in noise detected on that communication medium.

BACKGROUND

When two radios engage in point-to-point communication, those radios typically do so at a fixed data transmission rate. Typically, during a communication session, the data transmission rate does not change. If the signal-to-noise ratio drops sufficiently low, then the communication link between the two radios is completely lost; communication is completely interrupted. This all-or-nothing approach is not very tolerant of environmental conditions that might temporarily cause a decrease in the signal-to-noise ratio of radio communications.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

Figure 1:
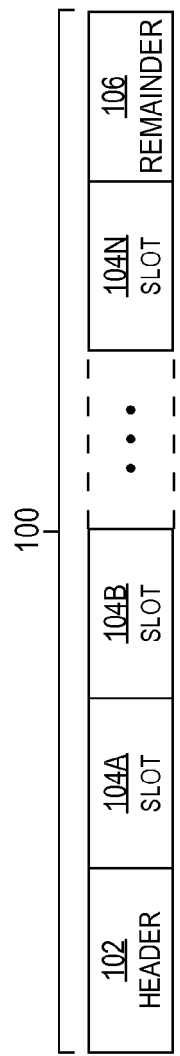
FIG. 1 shows an example of a superframe, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. U.S. Provisional Patent Application Ser. No. 61/017,128, to which the present application claims priority, is incorporated by reference herein.

Overview

Described herein are adaptive modulation techniques for use in radio communications. According to techniques described herein, when a signal-to-noise ratio affecting radio communication becomes sufficiently low, the data transmission rate is responsively decreased in compensation by changing the modulation scheme. At the reduced data transmission rate, the signal-to-noise ratio of the communication link is increased. Consequently, the communication link between the radios is maintained, though at a lower data transmission rate. This differs from previous approaches, in which a communication link was entirely lost when the signal-to-noise ratio became too low.

Data for multiple different services is transmitted in data packets between two radios using time division multiplexing (TDM). For example, a single data packet may contain some data relating to an Ethernet communication service, and also some data relating to a voice communication service. By allocating one part, or time slot, of the data packet's payload to one service, and allocating another part, or time slot, of the data packet's payload to another service, communications sessions for both services can be maintained concurrently. By making each part, or time slot, sufficiently small or of sufficiently limited duration, the latency of each service's communication session is kept to an acceptably low level; the amount of time that any service's communication session is made to wait before receiving additional data is kept at a level that is acceptable in view of the quality of service that is required for that service's communication session.

According to techniques described herein, services are prioritized relative to each other, so that in case the signal-to-noise ratio becomes too low, data packet portions that are related to lower-priority services can be omitted from at least some data packets before those data packets are transmitted. By sending data for fewer services in each packet, the combined data that is still sent can be sent at a reduced data transmission rate without causing the quality of service to fall below the minimum required level. As less information is transmitted in a particular bandwidth, more energy per bit is available to transmit that remaining information. Sending information at a reduced data transmission rate allows that information to be sent with less signal strength, and more noise can be tolerated.

For example, a voice communication service might be given a higher priority than the priority given to a concurrently occurring Ethernet communication service. Because Ethernet data can be re-transmitted, but voice data for a live voice communication session cannot be re-transmitted without adversely affecting quality of service, excluding Ethernet data from a data packet may be preferable to excluding voice data from that data packet. Therefore, voice communication services may be given a higher priority than Ethernet communications services. Under circumstances in which the signal-to-noise ratio becomes intolerably low, data packets can at least temporarily omit the data that is related to the Ethernet communication services, while maintaining the data that is related to the voice communication services.

According to techniques described herein, as noise increases, a transmitting radio automatically adapts the modulation scheme so that the modulated signal represents less data per time unit, resulting in the decreased data transmission rate. As noise decreases, the transmitting ratio automatically adapts the modulation scheme so that the modulated signal represents more data per time unit, resulting in an increased data transmission rate.

Other features that may be included in various other embodiments of the invention are discussed in more detail below.

Jitter and Voice Data

When sending voice data, the on-time arrival of bits representing that voice data is crucial. According to techniques described herein, as the data for some lower-priority communication services are dropped from data packets in order to increase the signal-to-noise ratio, the data for the higher-priority voice communication service may become more spread out over the data packet. This spreading out tends to increase latency and cause jitter. Described herein are techniques for ensuring that the spreading out of voice data over a larger portion of a data packet does not influence the on-time arrival of that voice data at the destination. Using these techniques, the adaptation of modulation in order to increase signal-to-noise ratio is completely transparent to the receiver of voice data. Thus, even though the rate at which voice data is being transmitted may decrease (in order to increase signal-to-noise ratio), the techniques described herein prevent the reduction in that rate from being detected by the receiver. In one embodiment of the invention, the delay produced by transmitting data at a lower rate is mitigated through adaptive buffering techniques, so that the delay does not introduce jitter.

Discussed below are two different techniques for transmitting multiple communication services' data in the same data packets, thereby achieving concurrency: an interleaved superframe technique, and a non-interleaved superframe technique. Each technique has its own set of advantages.

Interleaved Superframe and Variable Subframes

According to one embodiment of the invention, data for multiple different communication services (e.g., voice communication services, Ethernet communication services, etc.) is interleaved among different time slots in a data packet or "superframe." FIG. 1 shows an example of a superframe, which is a high-level data packet, according to an embodiment of the invention. In FIG. 1, superframe 100 contains a header 102, slots 104A-N, and a remainder 106. As used herein, the "size" of superframe 100 refers to the number of slots 104A-N in superframe 100. The frequency at which superframes are transmitted per unit of time, and the number of slots in each superframe, does not change in response to a change in the signal-to-noise ratio (however, the number of bits contained in a superframe may vary depending on the data transmission rate that can be achieved in view of the existing noise). Each of slots 104A-N is a time slot in which some amount of data may be transmitted. When the data transmission rate is high, then each of slots 104A-N can contain more data than those slots can contain when the data transmission rate is lower.

Each of slots 104A-N contains multiple subframes. Although the frequency at which superframes are transmitted, and the number of slots per subframe, does not change in response to a change in the data transmission rate, the number of subframes in each of slots 104A-N may be dynamically adjusted between superframes in response to such a change. When the data transmission rate becomes lower (to compensate for increased noise), the number of subframes per slot (in the next superframe to be transmitted) may be decreased (from the number of subframes per slot in the last superframe transmitted) in compensation. When the data transmission rate subsequently increases (in response to decreased noise), the number of subframes per slot (in the next superframe to be transmitted) may be increased (from the number of subframes per slot in the last superframe transmitted) in response. The number of slots in superframe 100 is not necessarily related to the number of subframes in each slot.

Figure 2:
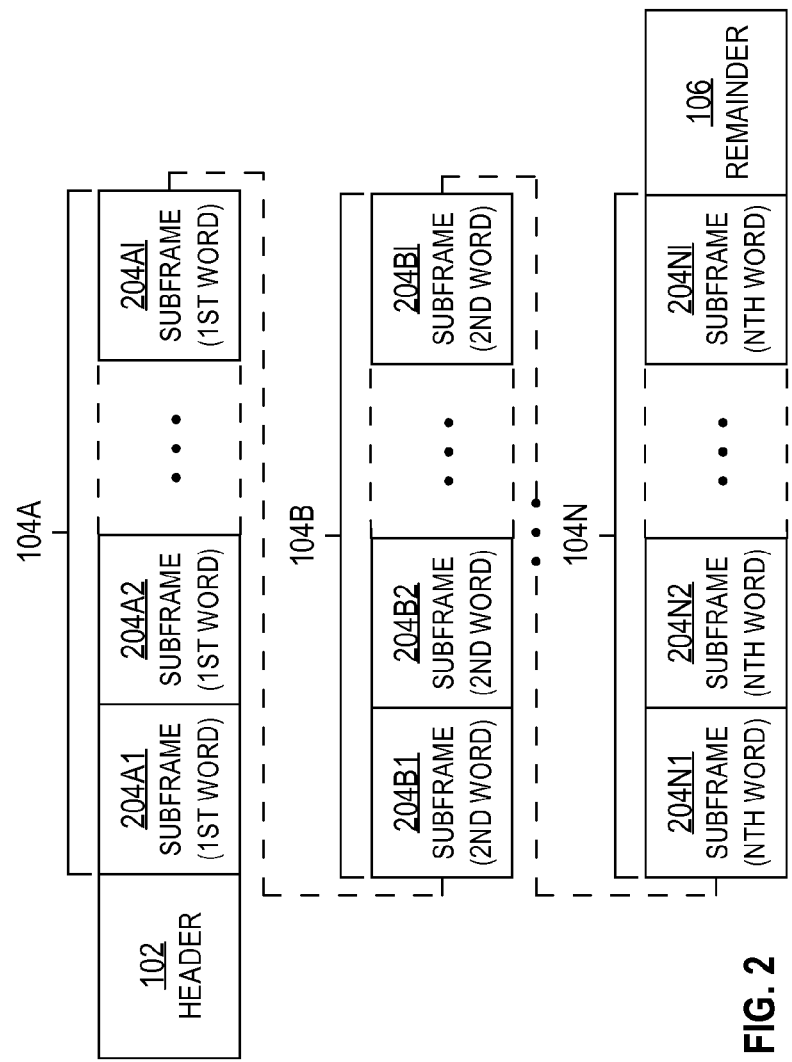
FIG. 2 shows an example of how subframes fill the slots of a superframe, according to an embodiment of the invention.

FIG. 2 shows an example of how subframes fill slots 104A-N of superframe 100, according to an embodiment of the invention. Each of slots 104A-N contains a separate word (a word being a portion of data in the amount of some specified quantity) for each communication service whose data is contained in superframe 100. Slot 104A contains the first word of each such communication service's data. Slot 104B contains the second word of each such communication service's data. Slot 104N contains the $N^{th}$ word of each such communication service's data.

Thus, slot 104A contains subframes 204A1-AI—a separate subframe for each communication service. Subframe 204A1 contains the first word of a first communication service's data. Subframe 204A2 contains the first word of a second communication service's data. The remaining subframes in slot 104A contain the first words of the remaining communication services' data in a manner that follows the foregoing pattern. Lastly, subframe 204AI contains the first word of an $I^{th}$ communication service's data, where I is the number of communication services whose data is contained in superframe 100.

Similarly, slot 104B contains subframes 204B1-BI. Subframe 204B1 contains the second word of the first communication service's data. Subframe 204B2 contains the second word of the second communication service's data. The remaining subframes in slot 104B contain the second words of the remaining communication services' data in a manner that follows the foregoing pattern. Lastly, subframe 204BI contains the second word of the $I^{th}$ communication service's data.

The remaining slots contain subframes and words in a manner that follows the foregoing pattern. Slot 104N contains subframes 204NA-NI. Subframe 204N1 contains the $N^{th}$ word of the first communication service's data. Subframe 204N2 contains the $N^{th}$ word of the second communication service's data. The remaining subframes in slot 104N contain the $N^{th}$ words of the remaining communication services' data in a manner that follows the foregoing pattern. Lastly, subframe 204NI contains the $N^{th}$ word of the $I^{th}$ communication service's data.

As is discussed above, the number of communication services whose data is carried by each superframe may be adjusted from superframe to superframe. Data for a low-priority communication service may be dropped, at least temporarily, from the next superframe to be transmitted in order to reduce the data transmission rate and increase the signal-to-noise ratio. When a communication service's data is dropped from a superframe, the subframes that contained the words of that communication service's data are not placed into that superframe's slots. Consequently, the number of subframes per slot in that superframe decreases by one, and the size of each slot therefore decreases allowing for a lower data rate given a fixed super frame rate (the super frame rate is always the same no matter what the data rate is. Datarate=superframerate(fixed)*(header(fixed or variable)+numberofslots(fixed)*numberofsubframes(variable)*wordsize)+remainder (variable or fixed).

In one embodiment of the invention, after each superframe is transmitted, the available data transmission rate is determined in view of the existing noise. The maximum data transmission rate "R" that currently can be achieved while maintaining the signal-to-noise ratio at a specified minimum level is determined. Based on this maximum data transmission rate "R," the number of subframes per each slot of the next superframe is determined. In one embodiment of the invention, the number of subframes is calculated by multiplying the superframe transmission frequency "$F_{sf}$" (i.e., the number of superframes transmitted per unit of time) by the number of slots in the superframe "n" to produce a particular value, then dividing the previously determined maximum data transmission rate "R" by this particular value, and then taking the integer part of the quotient. In one embodiment of the invention, the number of subframes "i" is determined by the formula $i=int((R-F_{sf}*headersize)/(F_{sf}*n*word\_size))$. The subframes that would have contained the data of the lowest-priority communications services are the first to be omitted from the next superframe that is going to be transmitted.

In one embodiment of the invention, header 102 contains information regarding the superframe format. This information may be negotiated between a sending device and a receiving device. For example, header 102 might contain information that indicates how many slots there are per superframe, and/or how many subframes per slot there are in that particular superframe. Such information enables the superframe recipient to parse and interpret the superframe's contents correctly. Header 102 additionally may contain error checking data, such as cyclical redundancy check (CRC) values, to enable the recipient to validate the correctness of the data in header 102.

In one embodiment of the invention, remainder 106 contains data for communications services that are not rate-critical. Optionally, remainder 106 may be omitted entirely. The length of remainder 106 may vary from superframe to superframe.

Using the interleaved superframe technique discussed above distributes the data for each communication service over the entire superframe. As a result, buffer size requirements are reduced, since a smaller "chunk" of the data for each service needs to be buffered up at the recipient before being forwarded to the consumer of that data. Buffers at the transmitter also may be reduced in size for similar reasons. As another result, overall buffer latency is reduced when transporting fixed-rate data streams. Since each slot of a subframe contains samples of data for each communication service whose data the superframe contains, no single service waits unduly long before receiving the next word of that service's data. This minimizing of delay for any given service can be highly beneficial under circumstances where data must be received in a continuous, smooth manner rather than in large bursts separated by long periods of time. For example, the interleaved superframe technique described above can be highly beneficial under circumstances where the data from one or more voice communication services, which are real-time and not highly tolerant of temporal fragmentation, need to be concurrently transmitted. The recipient is able to read the data at the same rate at which the data was transmitted.

In one embodiment of the invention, each subframe in the interleaved superframe is exactly the same size as every other subframe. However, in one embodiment of the invention, one or more subframes may be combined together in order to form larger subframes. In such an embodiment of the invention, these sizes of these larger superframes are integer multiples of the sizes of the smallest subframes. For example, a larger subframe might be exactly twice as large or exactly three times as large as another subframe. A first communication service's data might occupy some of the smaller subframes, while a second communication service's data might occupy some of the larger subframes. Having different subframe sizes for different services' data within a superframe may be useful, for example, under circumstances in which the superframe is carrying data for services that conform to different standards (e.g., T1 and E1).

Non-Interleaved Superframe

In an alternative embodiment of the invention, the data for each communication service is not distributed among multiple subframes in different slots of the superframe. Instead, in this alternative embodiment of the invention, the data for each communication service is kept together (rather than divided and distributed) within the superframe. This embodiment of the invention uses "sequential" subframes. For example, in this embodiment of the invention, the superframe may begin with a header, followed by a first subframe that contains all of the superframe's data for a first communication service, followed by a second subframe that contains all of the superframe's data for a second communication service, and so on, for each communication service whose data the superframe contains. In such an alternative embodiment of the invention, subframes are not required to be the same size (or exact multiples) as each other; the first subframe may be larger than the second subframe, for example. This non-interleaved superframe technique allows for greater flexibility, relative to the interleaved subframe technique, in adjusting subframe sizes (e.g., so that data for highly different services can be carried in the same superframe with less complexity), but can also require larger buffer sizes at the transmitter and recipient. The non-interleaved superframe technique also may cause more latency than the interleaved superframe technique does, since a greater amount of time may pass before any particular communication service receives its next "chunk" of data (although each chunk received may be larger in size).

Subframe Formats

Regardless of whether the interleaved superframe or non-interleaved superframe technique is used, there are multiple different techniques by which the data within an individual subframe (e.g., subframes 204A1-204NI shown in FIG. 2) can be formatted. According to one technique, the data contained in each subframe is a fixed size, and as much of a particular communication service's data as can fit into a subframe is placed into that subframe.

Sometimes, a communication service's data might be produced at a frame rate that does not exactly match the specified size of a subframe. For example, a subframe might be capable of containing 1 megabit of data, but a communication service's data might be arriving at the transmitter at a 1.00001 megahertz. In order to address this issue, according to an alternative technique, the amount of a communication service's data that is placed within a particular subframe can vary from subframe to subframe, and each subframe additionally contains one or more "control words" that indicate the quantity of the service's data (e.g., in bits) that is actually contained within that subframe. The control words allow the recipient to determine how much of the superframe's data belongs to a particular communication service.

In one embodiment of the invention, multiple copies of a control word are inserted at regular intervals within a subframe for redundancy purposes; in case one or more bits of the control word in one or more copies become corrupted during transmission, the recipient can compare the copies to determine which version of a control word is the correct version, if any. If two of three copies of a control word in a particular subframe match, then the recipient can act with reasonable assurance that the version that matches in two copies is correct, while the third unmatching copy is corrupted.

Figure 3:
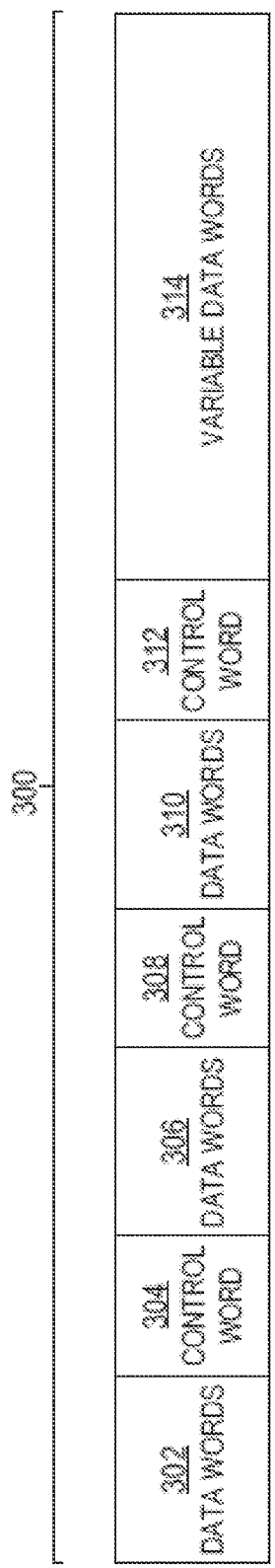
FIG. 3 shows an example of a subframe that contains multiple copies of a control word that indicates how much of a communication service's active data is contained within that subframe, according to an embodiment of the invention.

FIG. 3 shows an example of a subframe that contains multiple copies of a control word that indicates how much of a communication service's active data is contained within that subframe, according to an embodiment of the invention. Subframe 300 contains a first data words field 302, followed by a first control word field 304, followed by a second data words field 306, followed by a second control word field 308, followed by a third data words field 310, followed by a third control word field 312, followed by a variable data words field 314. In one embodiment of the invention, the contents of first control word field 304, second control word field 308, and third control word field 312 are all the same (at least, when subframe 300 is initially formed at the transmitter prior to transmission) for the redundancy purposes discussed above. In one embodiment of the invention, there are at least three copies of a control word present in each subframe, so that the recipient can use a majority voting technique in order to determine the correct control word value when at least one of the control word values disagrees with the other control word values.

In one embodiment of the invention, first data words field 302, second data words field 306, and third data words field 310 are all the same size, but these fields all contain different parts of a communication service's data. In contrast, variable data words field 314 might not contain the same quantity of the communication service's data as fields 302, 306, and 310 contain. Hence, variable data words field 314 contains a variable amount of data. The sizes of the active data contained in fields 302, 306, and 310 may all be the same from subframe to subframe (e.g., 100 bits), but the size of the active data contained in field 314 may differ from subframe to subframe (e.g., anywhere from 695 to 705 bits), even in subframes that contain the same communication service's data.

Control word fields 304, 308, and 312 each contain metadata that indicates how large the active (non-dummy) data contained in variable data words field 314 is. In one embodiment of the invention, each of control word fields 304, 308, and 312 contain just enough bits to indicate some variation from a standard size. For example, each of control word fields 304, 308, and 312 might contain 4 bits, with a capability to indicate a variation of plus 7 or minus 8 bits from a standard size, such as 700 bits. In one embodiment of the invention, the recipient determines the size of the data in variable data words field 314 by adding the value indicated in the agreeing control word fields to the standard size. Using the examples provided above, variable data words field 314 might contain anywhere between 692 bits (the standard size minus 8 bits) to 707 bits (the standard size plus 7 bits). The metadata contained in the agreeing control word fields specifies, for that particular subframe, the exact deviance from the standard size. In one embodiment of the invention, the control word fields are limited in size to the smallest number of bits that is needed to indicate the largest allowable variance from the specified standard size (the standard size being the size of the data in field 314 when there is zero variance), to reduce the amount of bandwidth that is consumed by metadata that does not actually reflect any communication service's actual data.

If the total amount of a communication service's data that is contained in subframe 300 is less than a fixed size of subframe 300, so that some of the capacity of subframe 300 is unused by either actual data or control words, then the remaining space can be packed with dummy bits that are ignored by the recipient. Typically, the quantity of these dummy bits will be relatively small, since the variable size adjustments that might need to be made from subframe to subframe are usually minute.

As shown in FIG. 3, control word fields 304, 308, and 312 are intentionally spaced apart from each other at some distance (which may vary from implementation to implementation) so that no single transmission error is likely to corrupt the contents of all three fields. Although the example described above uses three control word fields, alternative embodiments of the invention may place more than three control word fields within each subframe for greater protection. However, more overhead is added with each additional control word field. Although the example discussed above has the control fields spaced apart from each other by at least 100 bits, in one embodiment of the invention, each of the control fields is spaced as far away from each other control field as possible within each subframe.

Buffering and Control for Constant Latency

An example of the hardware that may be implemented in order to send and receive superframes of the kinds discussed above is described below. In one embodiment of the invention, a transmitter (e.g., a radio transmitter) of such superframes contains a framer (or multiple framers, one for each communication service whose data will be contained in a superframe), and a receiver (e.g., a radio receiver) of those superframes contains a de-framer (or multiple de-framers, one for each communication service whose data is contained in a superframe). The framer inserts data for various communication services into the subframes of a superframe, and then passes the superframe on to transmission hardware for transmission (e.g., over the air) to receiver hardware. The de-framer receives the superframe received by the receiver hardware, extracts each communication service's data from the superframe, and forwards each communication service's extracted data on to the consumer of that data. The framer and the de-framer data buffering are each discussed in turn below.

Framer

Figure 4:
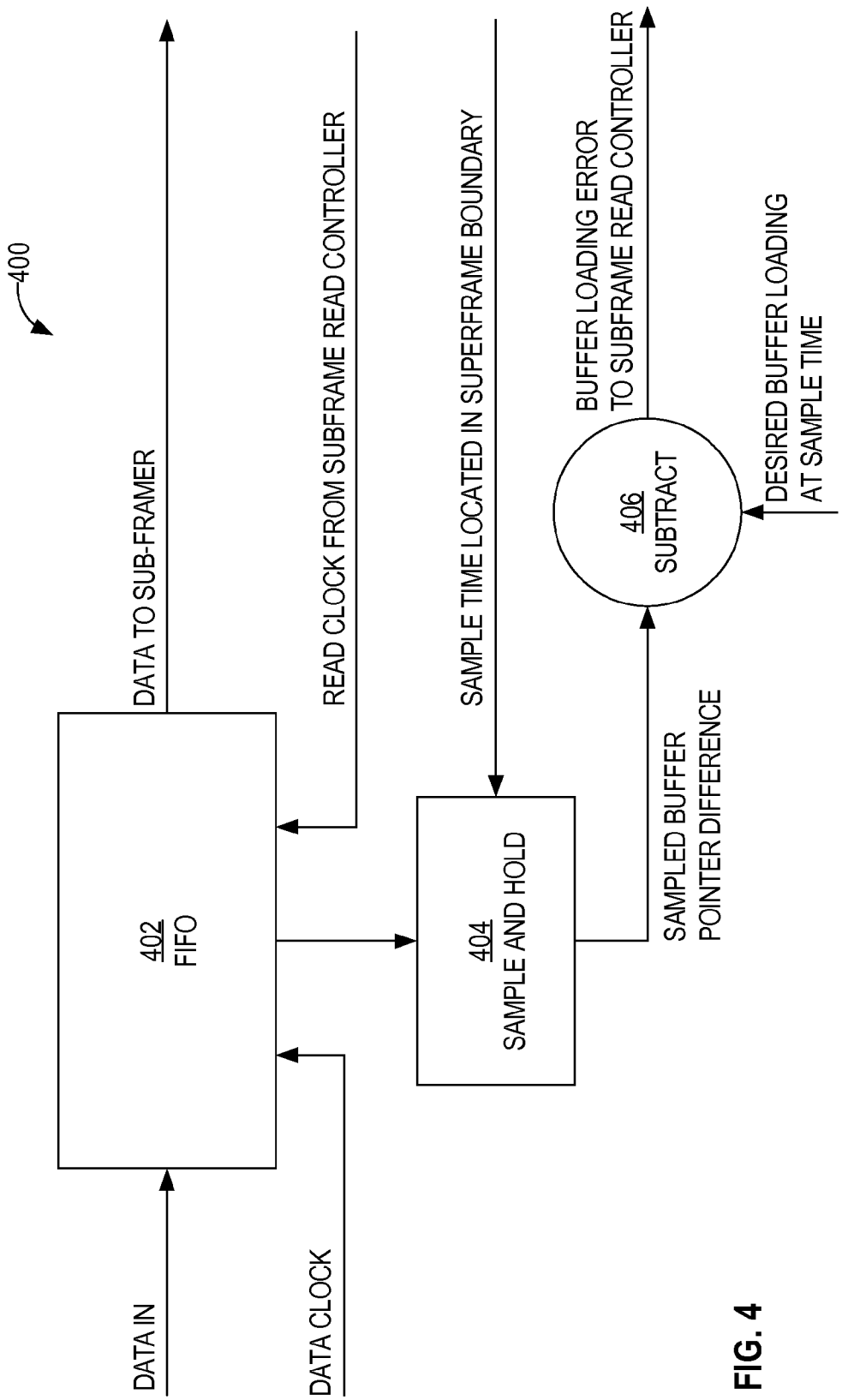
FIG. 4 is a block diagram that illustrates an example of a subframe buffering scheme for asynchronous data rates as used in a framer, according to an embodiment of the invention.

FIG. 4 is a block diagram that illustrates an example of a buffer 400, according to an embodiment of the invention. Buffer 400 may be used to insert time-division multiplexing (TDM) traffic into subframes of a superframe. An embodiment of the invention may include a separate buffer 400 for each data communication service whose data is going to be placed in the same superframe. Buffer 400 includes a first in first out (FIFO) mechanism 402, a sample and hold mechanism 404, and a subtract mechanism 406. FIFO mechanism 402 has several inputs: a "data in" input, a "data clock" input, and an input from the subframe read controller (not shown). Data from a particular communication service comes into FIFO mechanism 402 through the "data in" input. FIFO mechanism 402 buffers the data from the particular communication service before sending that data out through an output connected to a sub-framer mechanism (not shown), which inserts that data into an individual subframe (e.g., as shown in FIG. 3) of a superframe (e.g., as shown in FIGS. 1 and 2). Timing information received through the "data clock" input causes FIFO mechanism 402 to accept and store data at a constant rate. The "data clock" input may carry a timing signal from a crystal oscillator or other timing mechanism, for example.

The output to the sub-framer may be connected to a switch that alternates between multiple separate buffers, each like buffer 400. Each framer buffers data for a different communication service. The switch moves from framer to framer periodically, reading the data stored in each buffer before moving on to the next, and forwarding that data on. If an interleaved superframe is being created, then the switch may move from buffer to buffer frequently, reading only as much data from each buffer as permitted in a specified time interval, and spending no more than the specified amount of time reading from each buffer. If an interleaved superframe is being created, then the switch may make multiple rounds of reading each of the buffers for each superframe. Alternatively, if a non-interleaved, sequential superframe is being created, then the switch may read a greater amount of data from a particular buffer before moving on to read data from the next buffer. If a non-interleaved, sequential superframe is being created, then the switch may make a single round of reading each of the buffers for each superframe.

In one embodiment of the invention, data from FIFO mechanism 402 is eventually forwarded to a modulator (not shown), which encodes the outputted data into a signal for transmission. This modulator may modify the modulation scheme that it employs to encode the data differently in order to boost a signal-to-noise ratio, as is discussed above. If the data transmission rate needs to be reduced in order to boost the signal-to-noise ratio, then an input signal into the switch may cause the switch to skip reading from one or more framers (typically, the framers that queue up the lowest priority data), so that the data from those framers is not read for at least some of the superframes.

The rate at which data is read from FIFO mechanism 402 is determined by monitoring the status of FIFO mechanism 402. If a determination is made that FIFO mechanism 402 is filling up too fast, then more reads from FIFO 402 are performed. In one embodiment of the invention, FIFO mechanism 402 is implemented as a circular queue, with a read pointer that indicates the point in FIFO mechanism 402 where the oldest (least recently written) data in FIFO mechanism 402 is (the next data to be read from FIFO mechanism 402), and with a write pointer that indicates where new data should be written into FIFO mechanism 402. The data currently buffered in FIFO mechanism 402 exists between the write pointer and the read pointer, so as the amount of data buffered in FIFO mechanism 402 increases, the distance between the write pointer and the read pointer also increases. In one embodiment of the invention, the fullness of FIFO mechanism 402 is determined in part by sampling the difference between the read pointer and the write pointer in FIFO mechanism 402. In one embodiment of the invention, this sampling is performed by sample and hold mechanism 404. Sample and hold mechanism 404 holds the value of the difference between the read pointer and the write pointer at the most recent superframe boundary.

In one embodiment of the invention, the measurement of the fullness of FIFO mechanism 402 is performed by sampling the status of FIFO mechanism 402 at the superframe boundary. This status is held in sample and hold mechanism 404. An input into sample and hold mechanism 404 instructs sample and hold mechanism 404 as to when the superframe boundary has been reached, so that sample and hold mechanism 404 can sample the status of FIFO mechanism 402 at that time. FIFO mechanism 402 is sampled at the superframe boundary because the superframe boundary occurs at fixed intervals; other boundaries, such as subframe boundaries, may change dynamically depending on the number of subframes in each superframe. Sampling the FIFO status at the frame boundary causes the latency of the buffer to be constant independent of the number of subframes used at any time.

In one embodiment of the invention, sample and hold mechanism 404 sends the sampled buffer pointer difference (at the most recent superframe boundary) as a signal to subtract mechanism 406. Subtract mechanism 406 receives, in addition to this input signal, another input signal that indicates a desired buffer loading value—this value indicates a desired fullness for FIFO mechanism 402. Subtract mechanism 406 subtracts the sampled buffer pointer difference from the desired buffer loading value and mathematically determines the difference between the two values to be the buffer loading error value. Subtract mechanism 406 sends the buffer loading error value as a signal to the subframe read controller. The subframe read controller may use this error value to compute the metadata that will be inserted into the control word fields (e.g., control word fields 302, 308, and 312 of FIG. 3) of the current subframe, if control words are being used. The error value may be used to determine how much active data (i.e., non-metadata) is stored in the current subframe. The error value also may be used in order to determine whether the switch discussed above should cause more or fewer reads from FIFO mechanism 402 per unit of time, so that FIFO mechanism 402 becomes neither too full nor too empty. Using the technique described above, the fullness of FIFO mechanism 402 usually will approach the desired buffer loading value that is input into subtract mechanism 406.

In one embodiment of the invention, the switch discussed above does not remain for a longer or shorter amount of time at a buffer if the switch needs to perform more or fewer reads from that buffer. Instead, fewer reads are performed by sending dummy data to the switch, where necessary, instead of data that was actually received from a communication service. For example, the last bit of active data that was read from FIFO mechanism 402 may be repeatedly read as dummy bits in order to adjust the number of actual reads from FIFO mechanism 402 where necessary.

De-Framer Buffer

Figure 5:
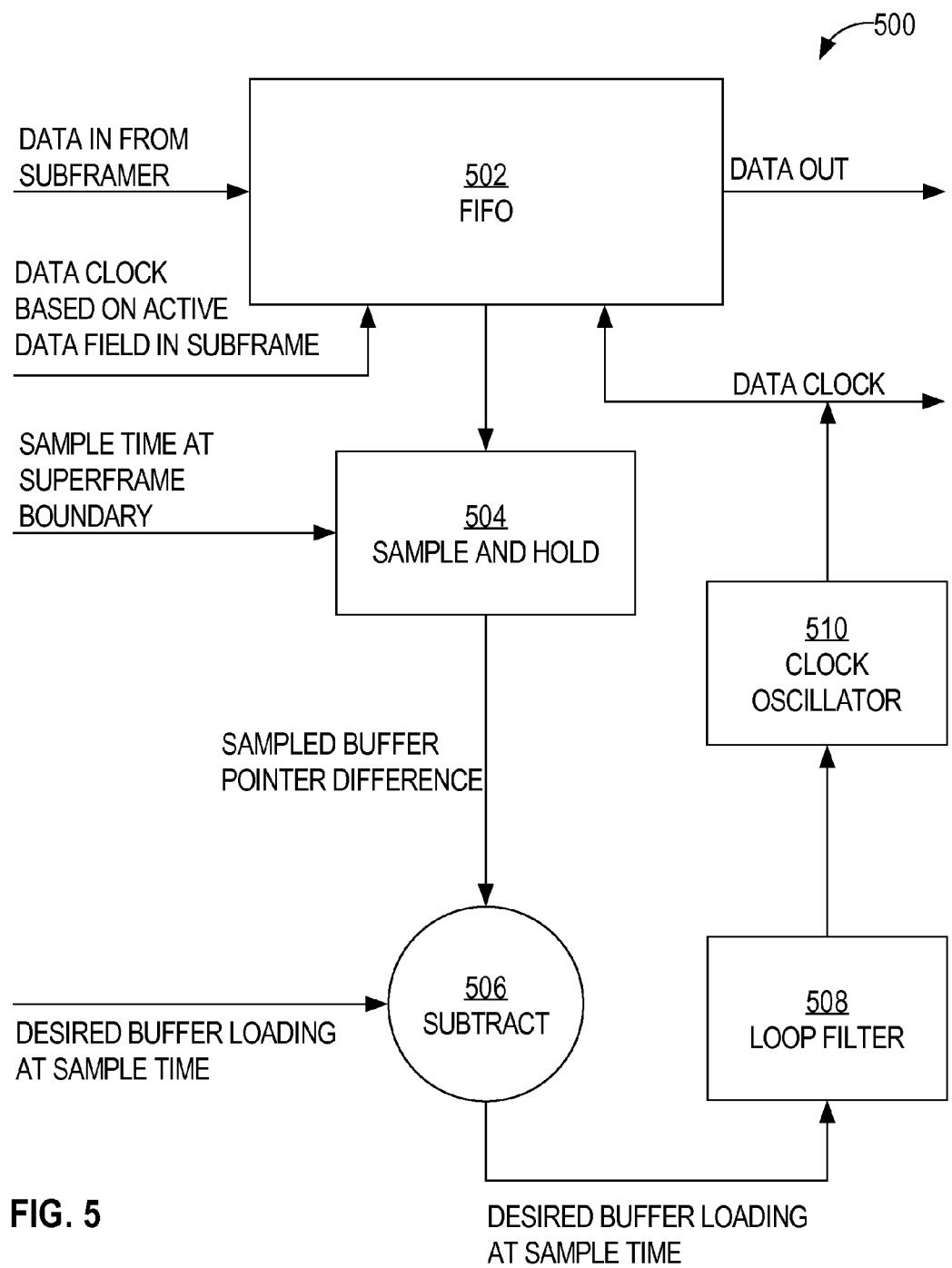
FIG. 5 is a block diagram that illustrates an example of a subframe buffering scheme for asynchronous data rates as used in a deframer, according to an embodiment of the invention.

FIG. 5 is a block diagram that illustrates an example of a de-framer buffer 500, according to an embodiment of the invention. De-framer buffer 500 essentially performs operations that are reciprocal to those performed by framer 400. De-framer buffer 500 comprises a FIFO mechanism 502, a sample and hold mechanism 504, a subtract mechanism 506, a loop filter 508, and a clock oscillator 510. FIFO mechanism 502 receives data for a particular communication service. The "data in" input to FIFO mechanism 502 may receive a signal from a switch that periodically feeds data to several different buffers (each like de-framer buffer 500) in turn. Each such buffer may accept data for a different communication service whose data is contained in a superframe. The switch at the receiving side receives superframes from a demodulator (not shown).

Similar to sample and hold mechanism 404, sample and hold mechanism 504 samples the read/write pointer difference of FIFO mechanism 502 at the superframe boundary to ensure that subframe data location changes within the superframe, caused by changes in the subframe count, do not affect the pointer difference reading. By sampling the pointer difference at the superframe boundary, latency is kept fixed and constant. Because each superframe is of a set and fixed size, hardware at the receiver can be pre-configured to detect when a superframe boundary has been reached.

Subtract mechanism 506 subtracts (a) the sampled pointer difference received from sample and hold mechanism 504 from (b) a specified desired buffer loading value that subtract mechanism 506 also receives as input, and determines a new desired buffer loading value based on the difference between the two values. Subtract mechanism 506 sends this new desired buffer loading value as a signal to loop filter 508.

Data is read out of FIFO mechanism 502 and forwarded to a data consumer through "data out" output. The rate at which data is read out of FIFO mechanism 502 is controlled by clock oscillator 510. The goal is to replicate, as closely as possible, the rate at which the data was originally received at the transmitter that contains buffer 400. The desired buffer loading value produced by subtract mechanism 506 is used by clock oscillator 510 to adjust the rate at which data is read from FIFO mechanism 502, to "smooth" the output of the data and to prevent jitter and latency variation. If FIFO mechanism 502 is becoming too full, then the value produced by subtract mechanism 506 will cause clock oscillator 510 to increase the read rate. Conversely, if FIFO mechanism 502 is becoming too empty, then the value produced by subtract mechanism 506 will cause clock oscillator 510 to decrease the read rate. As a result, the data is read from FIFO mechanism 502 and output to the consumer at a relatively even and smooth rate that approximates the rate at which the data was received at the transmitter.

Interposed between subtract mechanism 506 and clock oscillator 510 is loop filter 508. If not for the presence of loop filter 508, sharp increases or decreases in the desired buffer loading value passed to clock oscillator 510 might result in jitter in the data being output from FIFO mechanism 502. Loop filter 508 graduates the changes in the values received from subtract mechanism 506, so that changes in the rate of clock oscillator 510 occur more gradually, thereby reducing jitter in the output. Various mechanisms exist for implementing a loop filter.

Because the read rates from the FIFOs are determined based on the FIFO states as they exist at the superframe boundary (rather than somewhere in the superframe, such as at a subframe boundary), variable-sized subframes can be inserted into a superframe without introducing jitter. Variable-sized subframes allow for minute variations in the data transmission rates of different communications services whose data is contained in the same fixed-size superframe.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
transmitting, on a carrier at a first data transmission rate using a first modulation scheme, first data packets that contain data for a plurality of communication services that includes one or more first communication services and one or more second communication services;
wherein the step of transmitting the first data packets at the first transmission rate comprises inserting, into a subframe of at least one data packet that is to be transmitted, one or more copies of metadata that indicates a variance from a standard size of a communication service's data within the subframe;
detecting that a signal-to-noise ratio on the carrier is less than a specified threshold;
in response to detecting that the signal-to-noise ratio is less than the specified threshold, transmitting, on the carrier at a second data transmission rate using a second modulation scheme, second data packets that contain data for fewer communication services than are in the plurality of communication services, wherein the second data packets contain data for the one or more first communication services but not for the one or more second communication services;
wherein the second data transmission rate is lower than the first data transmission rate.

2. The method of claim 1, wherein the step of transmitting the first data packets at the first data transmission rate comprises:
transmitting at least a first data packet that is divided into a plurality of slots;
wherein each slot of the plurality of slots is further divided into a plurality of subframes;
wherein a first slot of the plurality of slots is divided into subframes that carry first words of data of each service in the plurality of services; and wherein a second slot of the plurality of slots is divided into subframes that carry second words of data of each service in the plurality of services.

3. The method of claim 1, wherein the step of transmitting the second data packets at the second data transmission rate comprises:
   determining a number of subframes by (a) multiplying a superframe frequency by a specified number of slots in the superframe to produce a first value, (b) dividing the second data transmission rate by the first value to produce a second value, and (c) setting the number of subframes equal to an integer portion of the second value;
   selecting, from the plurality of services, one or more services in number equal to (a) the number of services in the plurality of services minus (b) the number of subframes; and
   excluding, from at least one data packet that is to be sent at the second data transmission rate, subframes that would contain data for any of the one or more services.

4. The method of claim 3, wherein the step of selecting the one or more services comprises selecting, from the plurality of services, one or more services that are associated with priorities that are lower than priorities that are associated with any other services in the plurality of services.

5. The method of claim 3, wherein the first data packets that are transmitted at the first data transmission rate have the specified number of slots, wherein the second data packets that are transmitted at the second data transmission rate also have the specified number of slots, but wherein a number of subframes per slot in the first data packets that are transmitted at the first data transmission rate is greater than a number of subframes per slot in the second data packets that are transmitted at the second data transmission rate.

6. The method of claim 1, wherein the one or more copies of the metadata include multiple copies of the metadata, wherein each copy of the multiple copies of the metadata is spaced as far apart as possible from other copies of the metadata within the subframe.

7. The method of claim 1, further comprising:
   sampling contents of a FIFO mechanism at a superframe boundary;
   determining, based on contents sampled at the superframe boundary, whether data needs to be read from the FIFO mechanism at an increased rate; and
   in response to determining that data needs to be read from the FIFO mechanism at an increased rate, increasing a rate at which data is read from the FIFO mechanism;
   wherein the superframe boundary occurs at an end of a superframe; and
   wherein the superframe comprises multiple subframes, each containing data from a separate service of the plurality of services.

8. The method of claim 1, wherein the step of transmitting the first data packets at the first data transmission rate comprises:
   transmitting at least a first data packet that is divided into a plurality of subframes;
   wherein each subframe of the plurality of subframes corresponds to a different service of the plurality of services; and
   wherein a first subframe of the plurality of subframes corresponds to a first service of the plurality of services and contains all of the first data packet's data for the first service;
   wherein a second subframe of the plurality of subframes corresponds to a second service of the plurality of services and contains all of the first data packet's data for the second service;
   wherein the second subframe is different than the first subframe and the second service is different than the first service.

9. The method of claim 1, wherein the one or more copies of the metadata includes multiple copies of the metadata, the method further comprising:
   receiving, by a receiver, the at least one data packet;
   determining, by the receiver, that a particular copy of the multiple copies of the metadata is different than one or more other copies of the multiple copies of the metadata;
   determining, by the receiver, based on a number of the one or more other copies, to ignore the particular copy.

10. The method of claim 1, further comprising generating a first data packet of the first data packets, wherein generating the first data packet comprises:
    inserting, by a first framer that corresponds to a first service of the plurality of services, first data for the first service into the first data packet;
    inserting, by a second framer that corresponds to a second service of the plurality of services, second data for the second service into the first data packet;
    wherein the second framer is different than the first framer;
    wherein the second service is different than the first service.

11. A radio system comprising:
    a radio that includes a transmitter that is configured to transmit, on a carrier at a first data transmission rate using a first modulation scheme, first data packets that contain data for a plurality of communication services that includes one or more first communication services and one or more second communication services;
    wherein the radio also includes a detector that is configured to detect that a signal-to-noise ratio on the carrier is less than a specified threshold;
    wherein the radio is further configured to insert, into a subframe of at least one data packet that is to be transmitted, one or more copies of metadata that indicates a variance from a standard size of a communication service's data within the subframe;
    wherein, in response to the detector detecting that the signal-to-noise ratio is less than the specified threshold, the transmitter is configured to transmit, on the carrier at a second data transmission rate using a second modulation scheme, second data packets that contain data for fewer communication services than are in the plurality of communication services;
    wherein the second data packets contain data for the one or more first communication services but not for the one or more second communication services;
    wherein the second data transmission rate is lower than the first data transmission rate.

12. The radio system of claim 11, wherein:
    the transmitter is configured to transmit at least a first data packet that is divided into a plurality of slots;
    each slot of the plurality of slots is further divided into a plurality of subframes;
    a first slot of the plurality of slots is divided into subframes that carry first words of data of each service in the plurality of services;
    a second slot of the plurality of slots is divided into subframes that carry second words of data of each service in the plurality of services.

13. The radio system of claim 11, wherein the radio is configured to:
    determine a number of subframes by (a) multiplying a superframe frequency by a specified number of slots in the superframe to produce a first value, (b) dividing the second data transmission rate by the first value to produce a second value, and (c) setting the number of subframes equal to an integer portion of the second value;
    select, from the plurality of services, one or more services in number equal to (a) the number of services in the plurality of services minus (b) the number of subframes; and
    exclude, from at least one data packet that is to be sent at the second data transmission rate, subframes that would contain data for any of the one or more services.

14. The radio system of claim 13, wherein the radio is configured to select, from the plurality of services, one or more services that are associated with priorities that are lower than priorities that are associated with any other services in the plurality of services.

15. The radio system of claim 13, wherein:
    the first data packets that are transmitted at the first data transmission rate have the specified number of slots;
    the second data packets that are transmitted at the second data transmission rate also have the specified number of slots;
    a number of subframes per slot in the first data packets that are transmitted at the first data transmission rate is greater than a number of subframes per slot in the second data packets that are transmitted at the second data transmission rate.

16. The radio system of claim 11, wherein:
    the one or more copies of the metadata include multiple copies of the metadata;
    each copy of the multiple copies of the metadata is spaced as far apart as possible from other copies of the metadata within the subframe.

17. The radio system of claim 11, wherein the radio is further configured to:
    sample contents of a FIFO mechanism at a superframe boundary;
    determine, based on contents sampled at the superframe boundary, whether data needs to be read from the FIFO mechanism at an increased rate; and
    increase a rate at which data is read from the FIFO mechanism in response to determining that data needs to be read from the FIFO mechanism at an increased rate;
    wherein the superframe boundary occurs at an end of a superframe;
    wherein the superframe comprises multiple subframes, each containing data from a separate service of the plurality of services.

18. The radio system of claim 11, wherein:
    the transmitter is configured to transmit a first data packet that is divided into a plurality of subframes;
    each subframe of the plurality of subframes corresponds to a different service of the plurality of services; and
    a first subframe of the plurality of subframes corresponds to a first service of the plurality of services and contains all of the first data packet's data for the first service;
    a second subframe of the plurality of subframes corresponds to a second service of the plurality of services and contains all of the first data packet's data for the second service;
    the second subframe is different than the first subframe and the second service is different than the first service.

19. The radio system of claim 11, wherein the one or more copies of the metadata includes multiple copies of the metadata, wherein the radio system further comprises a second radio that is configured to:
    receive the at least one data packet;
    determine that a particular copy of the multiple copies of the metadata is different than one or more other copies of the multiple copies of the metadata;
    determine, based on a number of the one or more other copies, to ignore the particular copy.

20. The radio system of claim 11, wherein the radio comprises:
    a first framer that is configured to insert, into a first data packet, first data for a first service of the plurality of services;
    a second framer that is configured to insert, into the first data packet, second data for a second service of the plurality of services;
    wherein the second framer is different than the first framer;
    wherein the second service is different than the first service.

* * * * *